(12) United States Patent
Guemmer

(10) Patent No.: US 9,394,794 B2
(45) Date of Patent: Jul. 19, 2016

(54) FLUID-FLOW MACHINE—BLADE WITH HYBRID PROFILE CONFIGURATION

(75) Inventor: Volker Guemmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 719 days.

(21) Appl. No.: 13/314,274

(22) Filed: Dec. 8, 2011

(65) Prior Publication Data

US 2012/0148396 A1  Jun. 14, 2012

(30) Foreign Application Priority Data

Dec. 8, 2010 (DE) .................... 10 2010 053 798

(51) Int. Cl.
  *F01D 5/14* (2006.01)
  *F04D 29/32* (2006.01)
  *F04D 29/38* (2006.01)
  *F04D 29/54* (2006.01)

(52) U.S. Cl.
  CPC ............. *F01D 5/145* (2013.01); *F01D 5/146* (2013.01); *F04D 29/324* (2013.01); *F04D 29/384* (2013.01); *F04D 29/544* (2013.01); *F05D 2240/301* (2013.01); *Y02T 50/673* (2013.01)

(58) Field of Classification Search
  CPC ............ F01D 5/14; F01D 5/141; F01D 5/146
  USPC ......... 415/191; 416/91, 227 A, 227 R, 231 B, 416/231 R
  See application file for complete search history.

(56) References Cited

U.S. PATENT DOCUMENTS

| | | | | |
|---|---|---|---|---|
| 2,003,073 A | * | 5/1935 | Faber ....................... | 416/231 R |
| 2,045,383 A | * | 6/1936 | Faber ........................ | 415/222 |
| 2,135,887 A | * | 11/1938 | Fairey ....................... | 416/23 |
| 2,149,951 A | * | 3/1939 | Baker ........................ | 416/91 |
| 2,160,323 A | * | 5/1939 | Barnett ...................... | 416/231 R |
| 2,166,823 A | * | 7/1939 | Rosenlocher ............... | 415/208.1 |
| 2,637,487 A | * | 5/1953 | Sawyer ...................... | 415/115 |
| 3,044,559 A | * | 7/1962 | Chajmik ..................... | 416/228 |
| 3,075,743 A | * | 1/1963 | Sheets ....................... | 415/220 |

(Continued)

FOREIGN PATENT DOCUMENTS

| | | |
|---|---|---|
| DE | 8714447 | 3/1988 |
| DE | 3708159 | 9/1988 |

(Continued)

OTHER PUBLICATIONS

German Search Report dated Sep. 26, 2011 from counterpart foreign application.

(Continued)

*Primary Examiner* — Sean J Younger
(74) *Attorney, Agent, or Firm* — Timothy J. Klima; Shuttleworth & Ingersoll, PLC

(57) ABSTRACT

A blade for use in a fluid-flow machine, where at least one of the meridional flow line profile sections MSLi and MSLo is provided at a distance of max. 35% of the main flow path width from the respective inner and outer main flow path boundaries. The blade has in at least parts of a central area a multi-profile configuration such that at least two partial profiles (7, 9, 10) arranged one behind the other in the flow direction are provided, of which each has substantially the shape of a blade profile, where a passage (8) is provided between each two partial profiles and is passed through by fluid from the blade pressure side to the blade suction side.

20 Claims, 14 Drawing Sheets

(56) References Cited

U.S. PATENT DOCUMENTS

Figure 1:
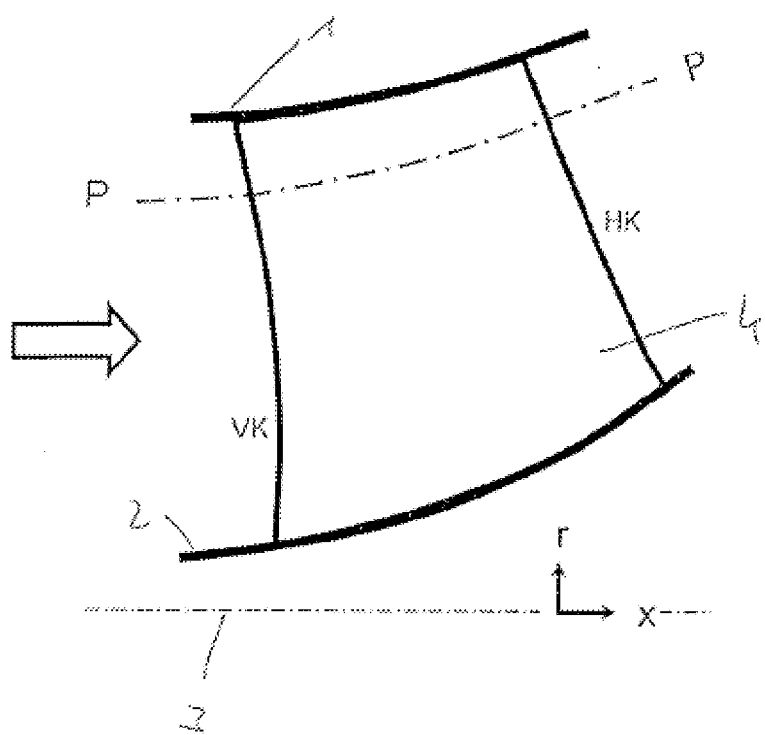
Figure 1:
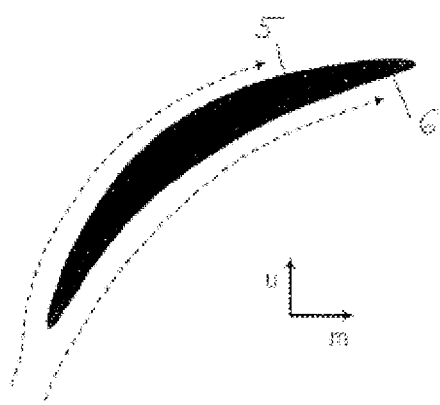

| | | | |
|---|---|---|---|
| 3,195,807 A * | 7/1965 | Sheets | 415/220 |
| 4,102,600 A * | 7/1978 | Schwab | 416/91 |
| 4,913,670 A * | 4/1990 | Spranger | 440/49 |
| 6,206,635 B1 * | 3/2001 | Golm et al. | 415/209.1 |
| 6,435,815 B2 * | 8/2002 | Harvey et al. | 415/115 |
| 7,025,569 B2 * | 4/2006 | Chang et al. | 416/183 |
| 7,281,900 B2 * | 10/2007 | Zientek | 416/231 B |
| 7,396,208 B1 * | 7/2008 | Hussain | 416/91 |
| 7,462,014 B2 * | 12/2008 | Chang et al. | 415/193 |
| 2005/0129518 A1 | 6/2005 | Havel et al. | |
| 2008/0298974 A1 * | 12/2008 | Guemmer | 416/223 R |
| 2009/0003989 A1 * | 1/2009 | Guemmer | 415/115 |
| 2010/0303629 A1 | 12/2010 | Guemmer | |
| 2010/0303634 A1 * | 12/2010 | Long | 416/90 A |

FOREIGN PATENT DOCUMENTS

| | | | |
|---|---|---|---|
| EP | 1998049 A2 | 12/2008 | |
| GB | 2106193 | 4/1983 | |
| JP | 02112700 A * | 4/1990 | F04D 29/38 |
| JP | 02157496 A * | 6/1990 | F04D 29/38 |
| WO | 2005040559 A1 | 5/2005 | |
| WO | WO 2005040559 A1 * | 5/2005 | F01D 5/14 |

OTHER PUBLICATIONS

European Search Report dated Jun. 25, 2014 from counterpart application No. 11009441.4.

* cited by examiner

Meridional view, simplified

Profile section P-P

Section HBi

Section C-C

FLUID-FLOW MACHINE—BLADE WITH HYBRID PROFILE CONFIGURATION

This application claims priority to German Patent Application DE102010053798.5 filed Dec. 8, 2010, the entirety of which is incorporated by reference herein.

The present invention relates to blades of fluid-flow machines, such as blowers, compressors, pumps, fans and turbines of the axial, semi-axial and radial type using gaseous or liquid working media. The fluid-flow machine may include one or several stages, each having a rotor and a stator, in individual cases, the stage only includes a rotor. The rotor blades and stator vanes are arranged in a main flow path, which is confined by main flow path boundaries, usually a casing structure on the outside and a hub structure on the inside.

The rotor includes a number of blades, which are connected to the rotating shaft of the machine. The rotor may be designed with or without a shroud at the outer blade ends.

The stator includes a number of stationary vanes, which may either feature a fixed or a free vane end on the hub and on the casing side.

The rotor drum and blading are usually enclosed by a casing forming the outer main flow path boundary, while in other cases in accordance with the invention, for example aircraft or ship propellers, no such casing exists and the outer main flow path boundary is formed by the outermost meridional flow line touching the blade tip of the rotor.

The flow in blade rows of aerodynamically highly loaded fluid-flow machines is characterized by a very high flow deflection to be achieved. The necessary flow deflection can be so high, either in parts of the blade height or along the entire blade height, that a conventional design according to the prior art for the blade profile sections leads to premature separation of the boundary layer flow on the blade profile and in the side wall area at the hub and casing.

Conventional blades as shown in FIG. 1 are, without additional design features for stabilizing the profile and wall boundary layers, unsuitable due to extremely high pressure losses and the non-achievement of the required flow deflection. In addition, the secondary flows occurring in the area of the confining side walls (at hub 2 and casing 1) become uncontrollable and lead to further very high total pressure losses. The consequence of this is overall poor performance characteristics of the fluid-flow machine in terms of efficiency and the available stability margin.

Blade rows with a profile configuration according to the prior art, see FIG. 1, thus have, due to the heavy aerodynamic loading of the boundary layers which occurs, i.e. of the two-dimensional boundary layers on the profile and of the three-dimensional boundary layers on the hub and casing wall, too low a working range and too high losses to achieve the operating characteristics required in modern fluid-flow machines.

The present invention, in a broad aspect, provides a blade for a fluid-flow machine, which is characterized by high efficiency.

In accordance with the invention, a blade is thus provided for use in a fluid-flow machine, arranged in a main flow path with the main flow path width W and split along the blade height into the inner boundary area IRB (between the inner main flow path boundary and a nearby inner meridional flow line profile section MSLi), the outer boundary area (between the outer main flow path boundary and a nearby outer meridional flow line profile section MSLo) and the central area (between the inner meridional flow line profile section MSLi and the outer meridional flow line profile section MSLo), where it is favorable when at least one of the meridional flow line profile sections MSLi and MSLo is provided at a distance of 35% of the main flow path width from the respective main flow path boundary, where it is particularly favorable when at least one of the meridional flow line profile sections MSLi and MSLo is provided at a distance of 20% of the main flow path width from the respective main flow path boundary, where in an advantageous development the blades have in at least parts of the central area a multi-profile configuration such that at least two partial profiles arranged one behind the other in the flow direction are provided, of which each has substantially the form of a blade profile with an aerodynamically efficiently shaped leading edge, where in an advantageous development a passage is provided between each two partial profiles and is passed through by fluid from the blade pressure side to the blade suction side, where at least one passage has, along the blade height, a variable passage width defined by the smallest measurable distance between the contours of two adjacent partial profiles, where in an advantageous embodiment the development of the passage width along the blade height assumes a maximum value in at least one of the inner and outer boundary areas, where in an advantageous development the shape of the meridional flow line profile sections of the blade, as viewed along the blade height, changes inside at least one of the inner and outer boundary areas from the "multi-profile" type to the "single-profile" type and the at least one passage ends there in this way, where in an advantageous development a remaining distance between the edge of the passage on the blade pressure side and the innermost or outermost blade section is always provided in the blade height direction.

It can be favorable here in accordance with the invention if one of the boundary areas IRB and ARB is provided at a fixed blade end (provided with a shroud or blade root) and the shape of the meridional flow line profile sections changes there from the "multi-profile" type to the "single-profile" type.

Figure 2:
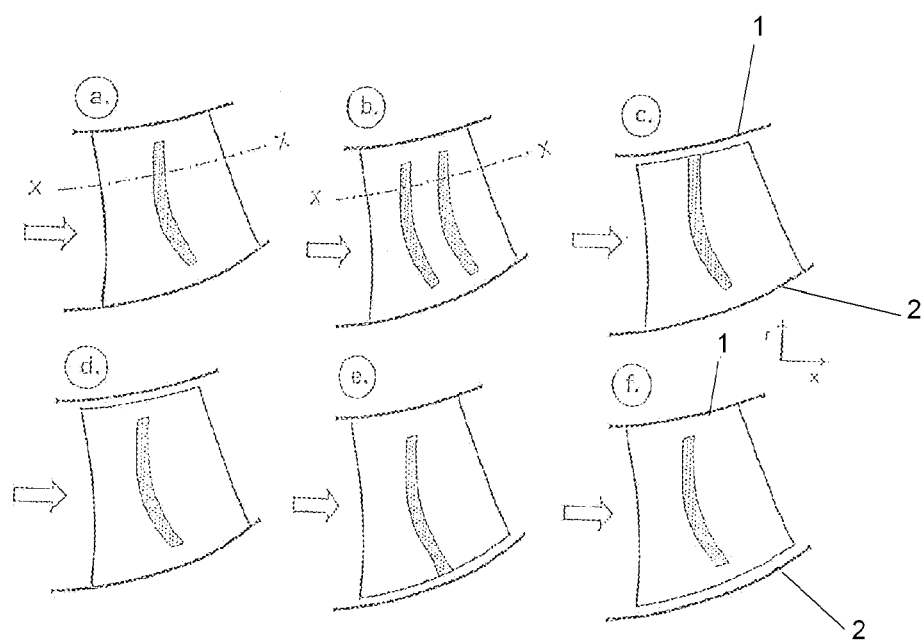
Figure 3:
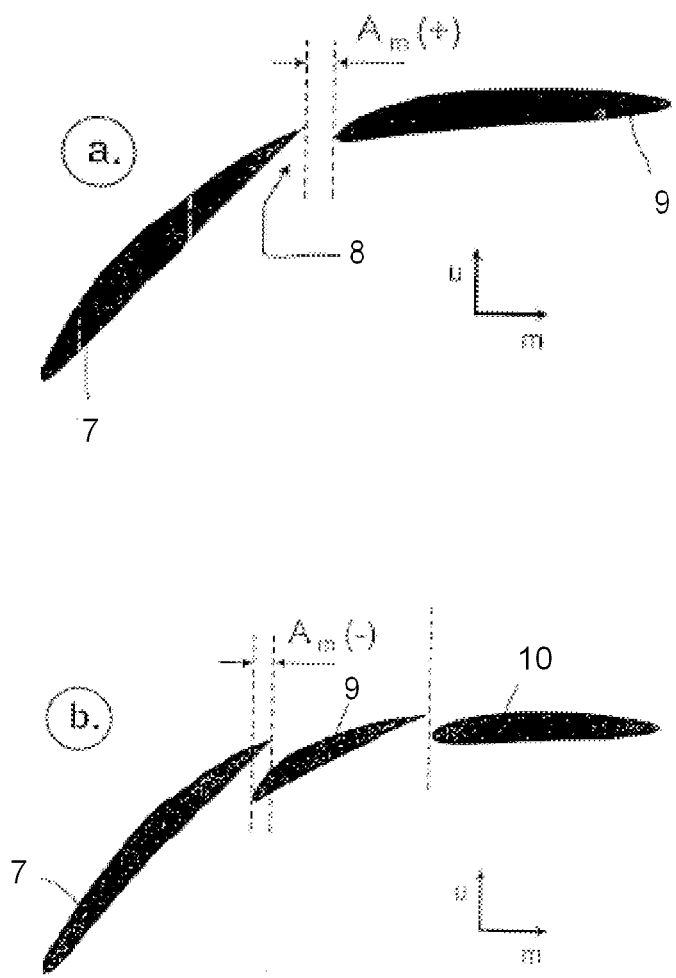
Figure 4:
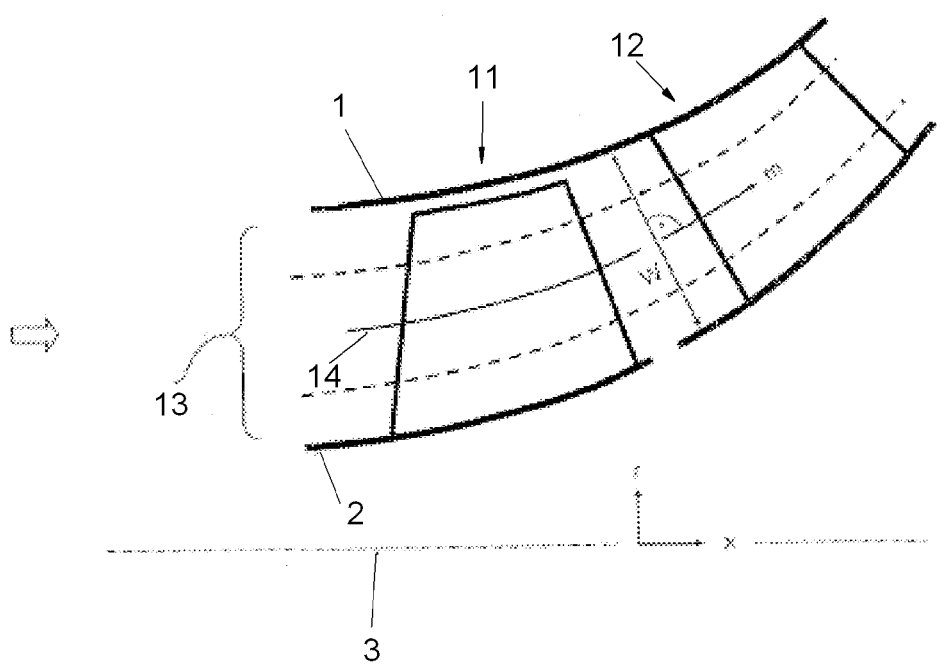
Figure 5A:
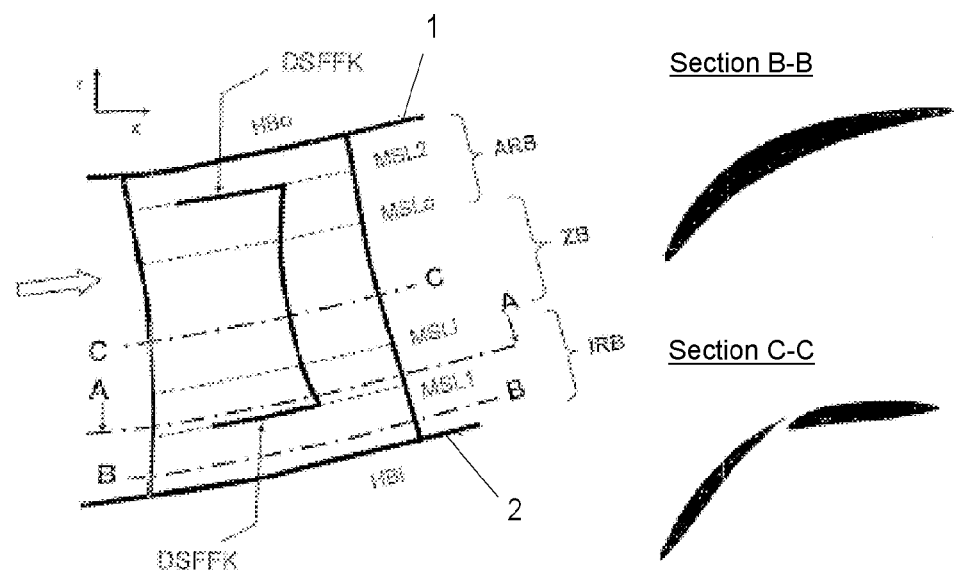
Figure 5B:
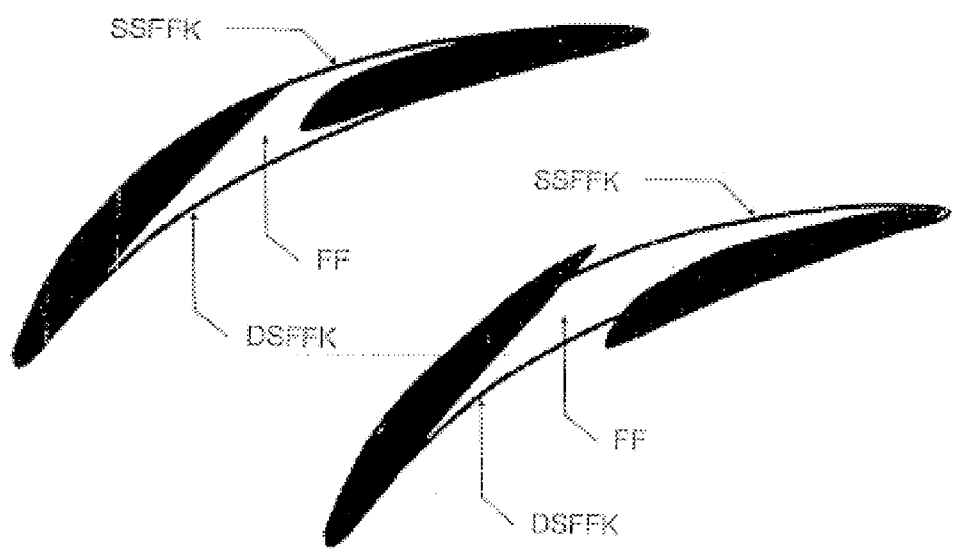
Figure 5C:
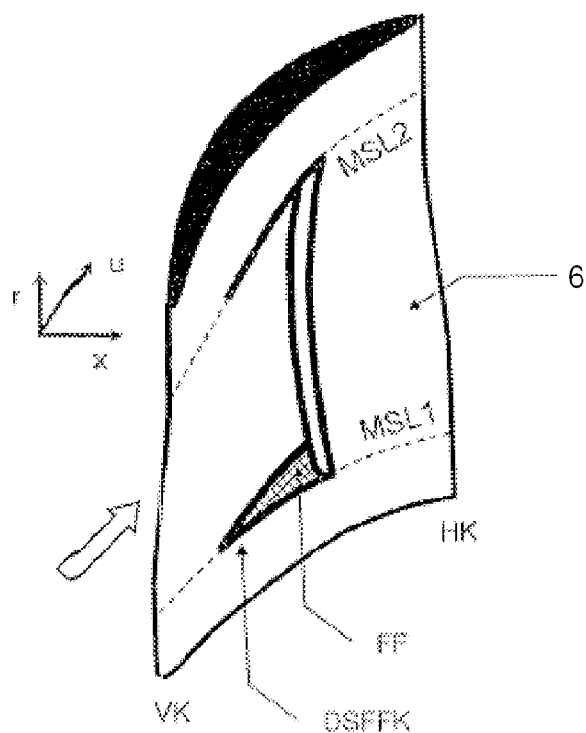
Figure 5C:
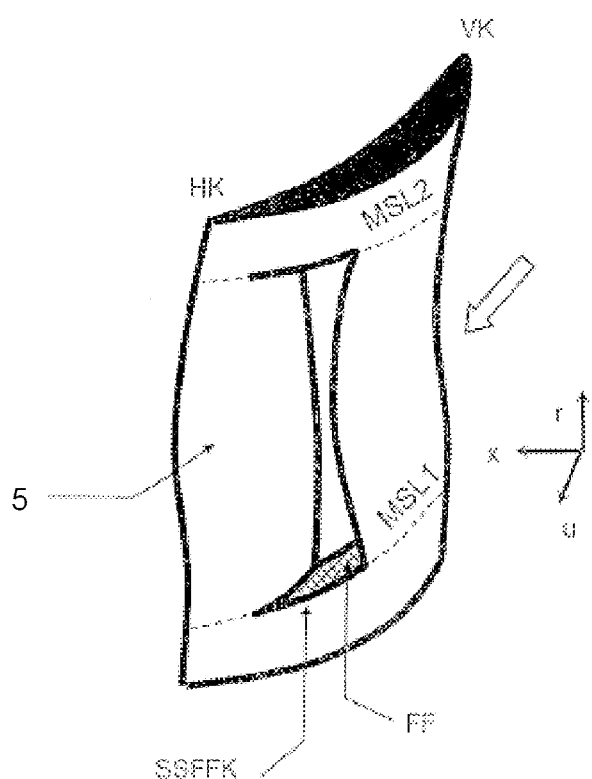
Figure 5D:
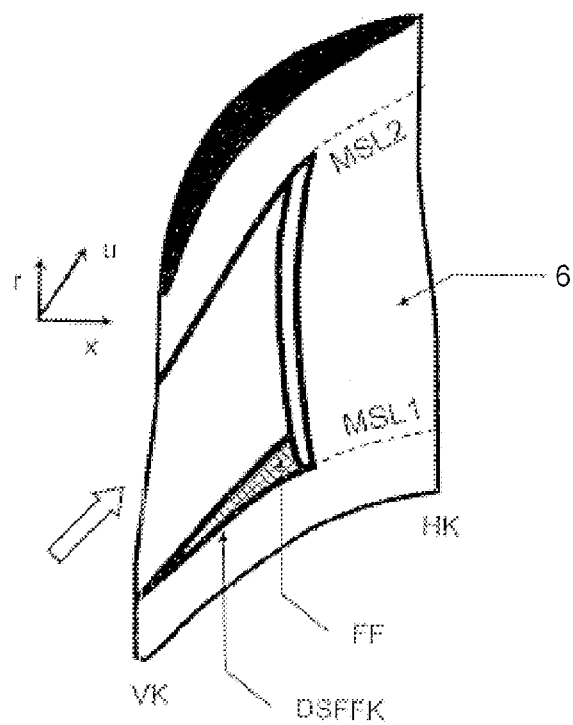
Figure 5D:
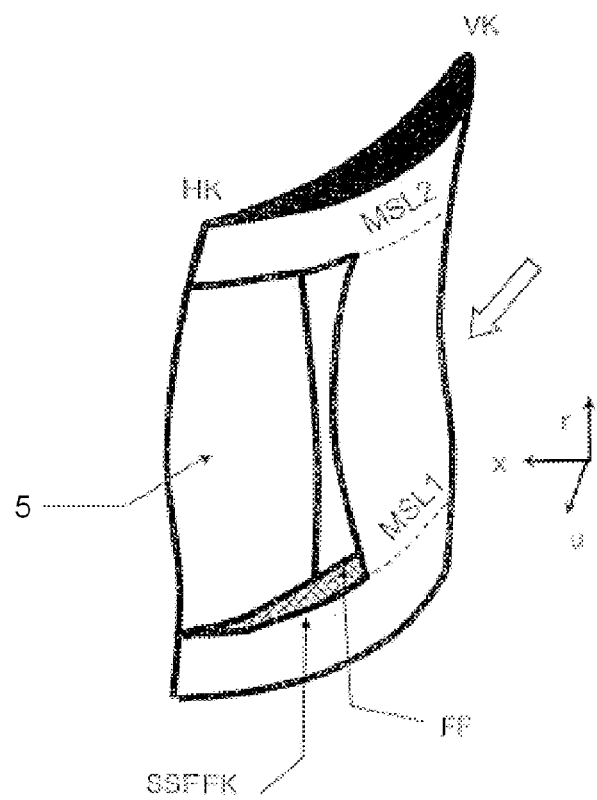
Figure 5E:
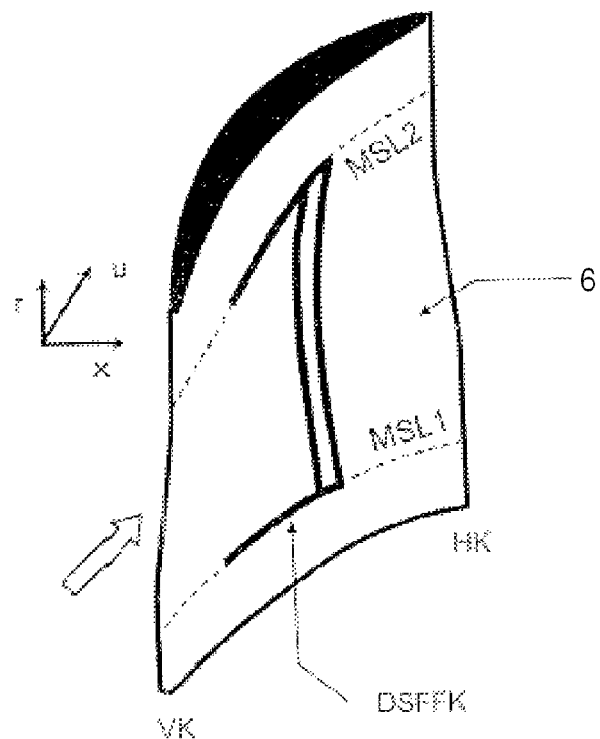
Figure 5E:
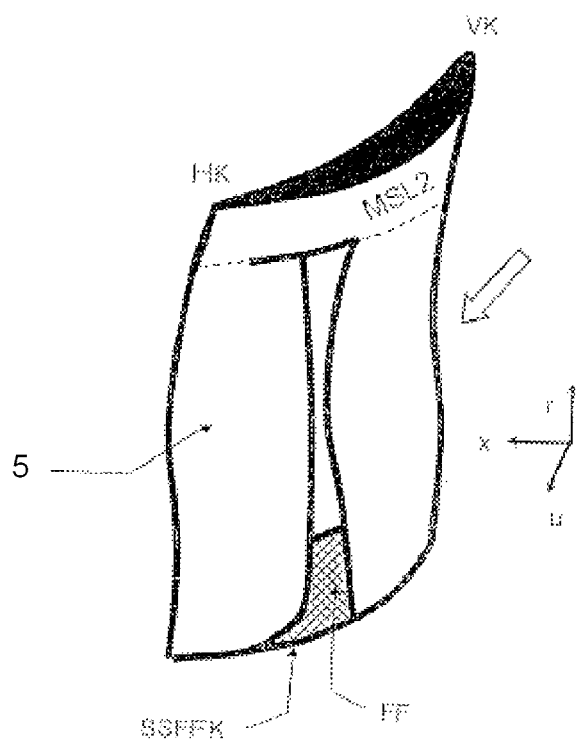
Figure 6A:
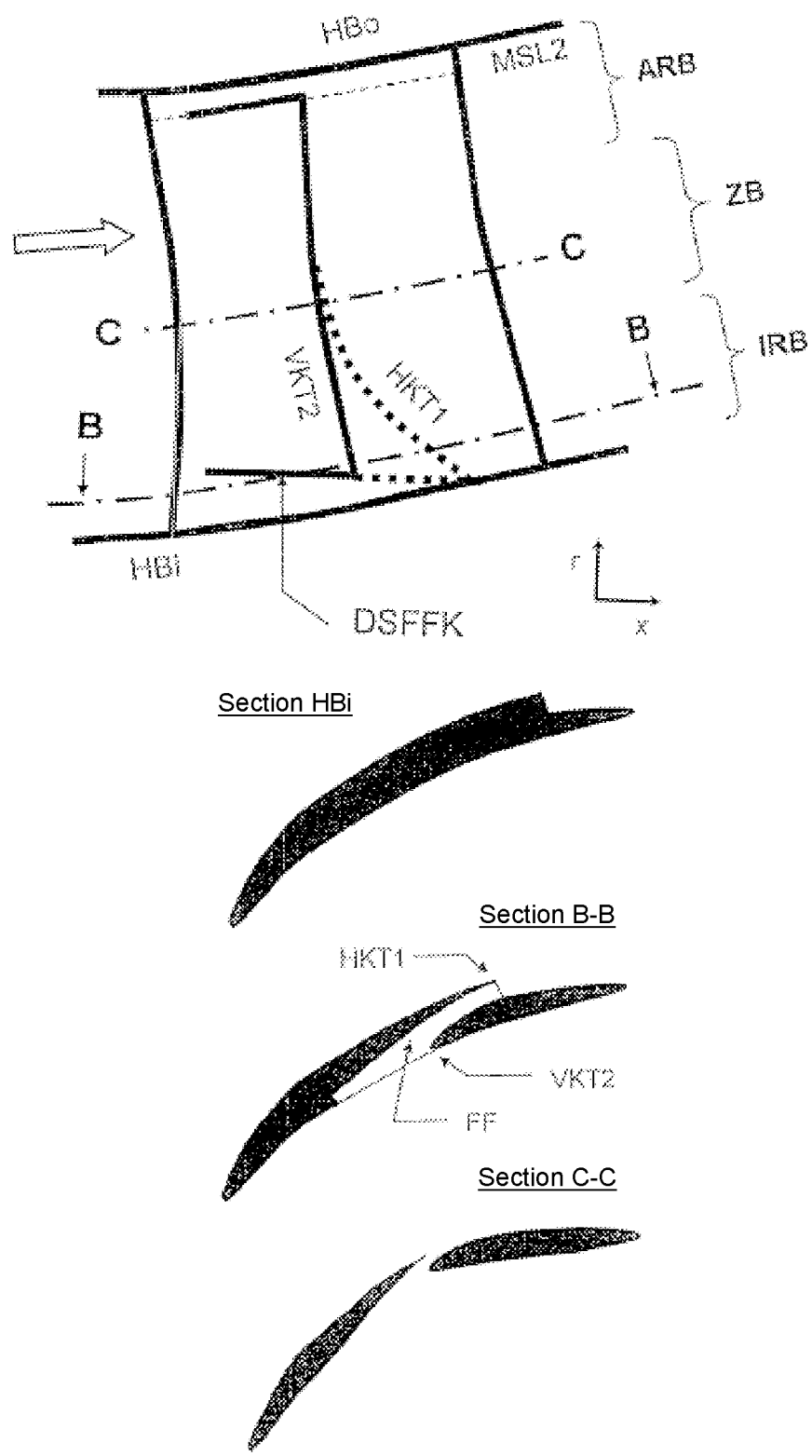
Figure 6B:
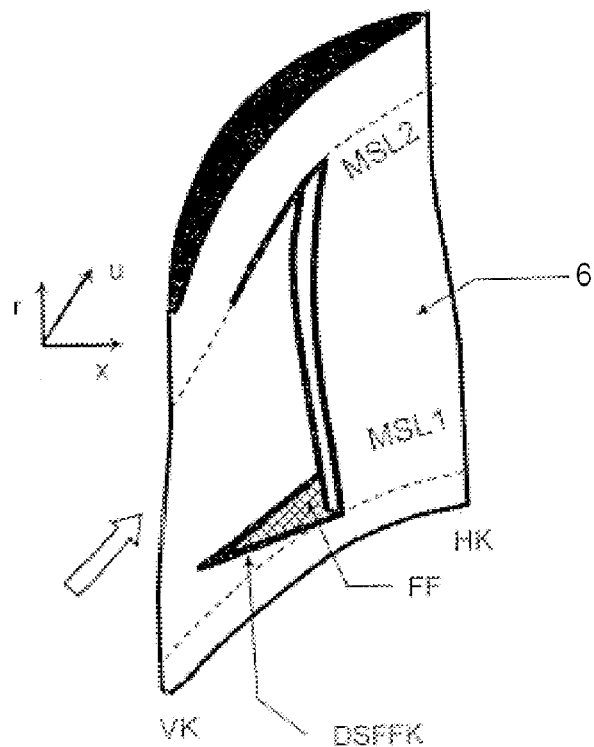
Figure 6B:
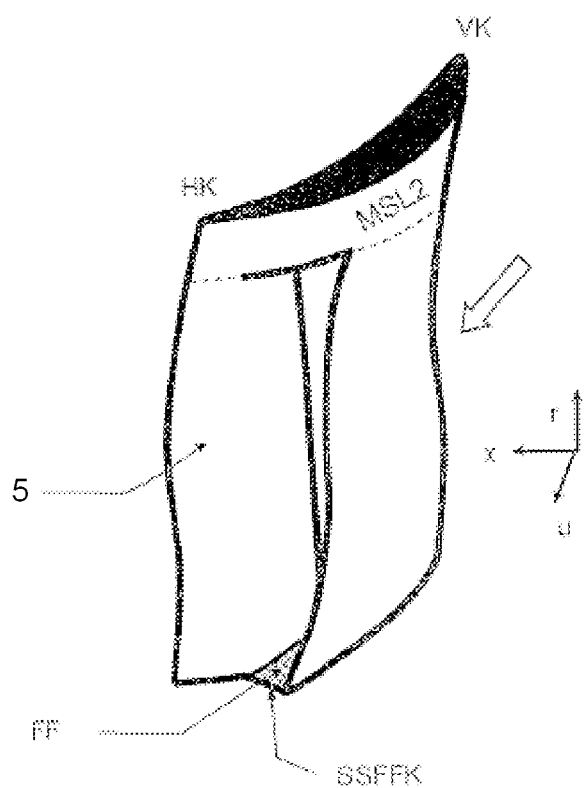
Figure 6C:
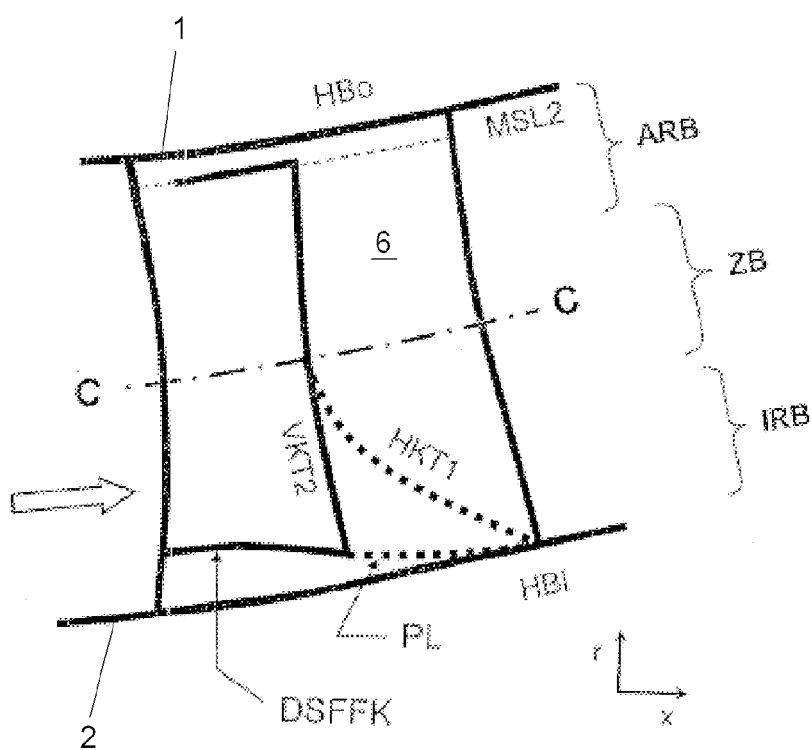
Figure 6C:
Figure 6C:
Figure 6D:
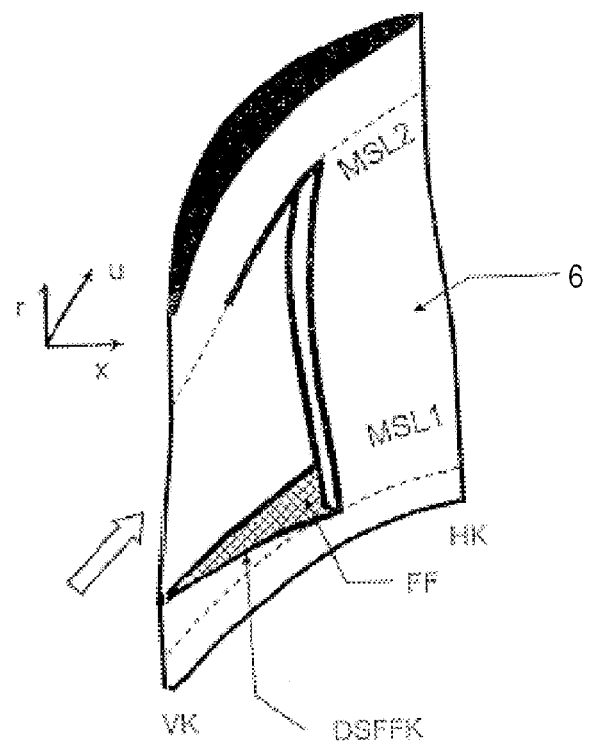
Figure 6D:
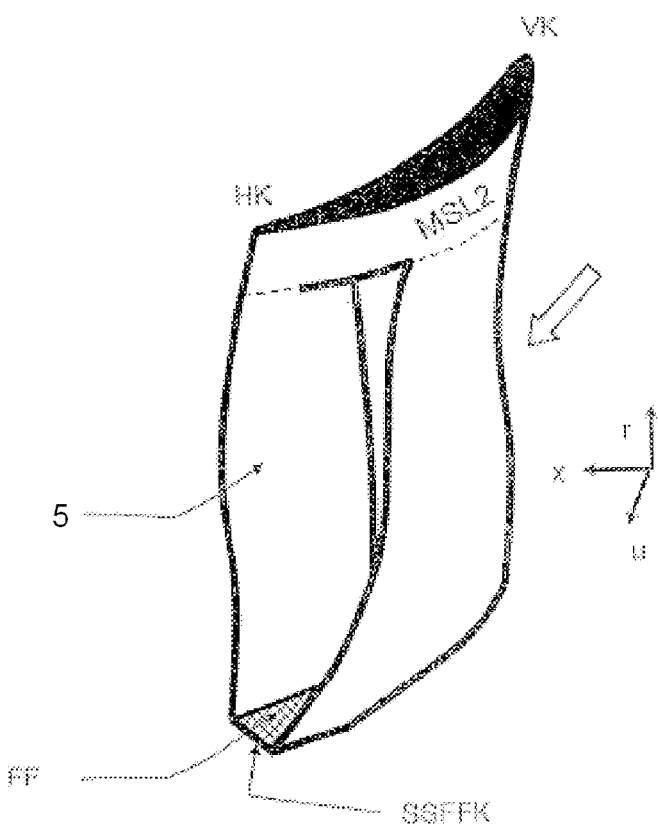
Figure 7A:
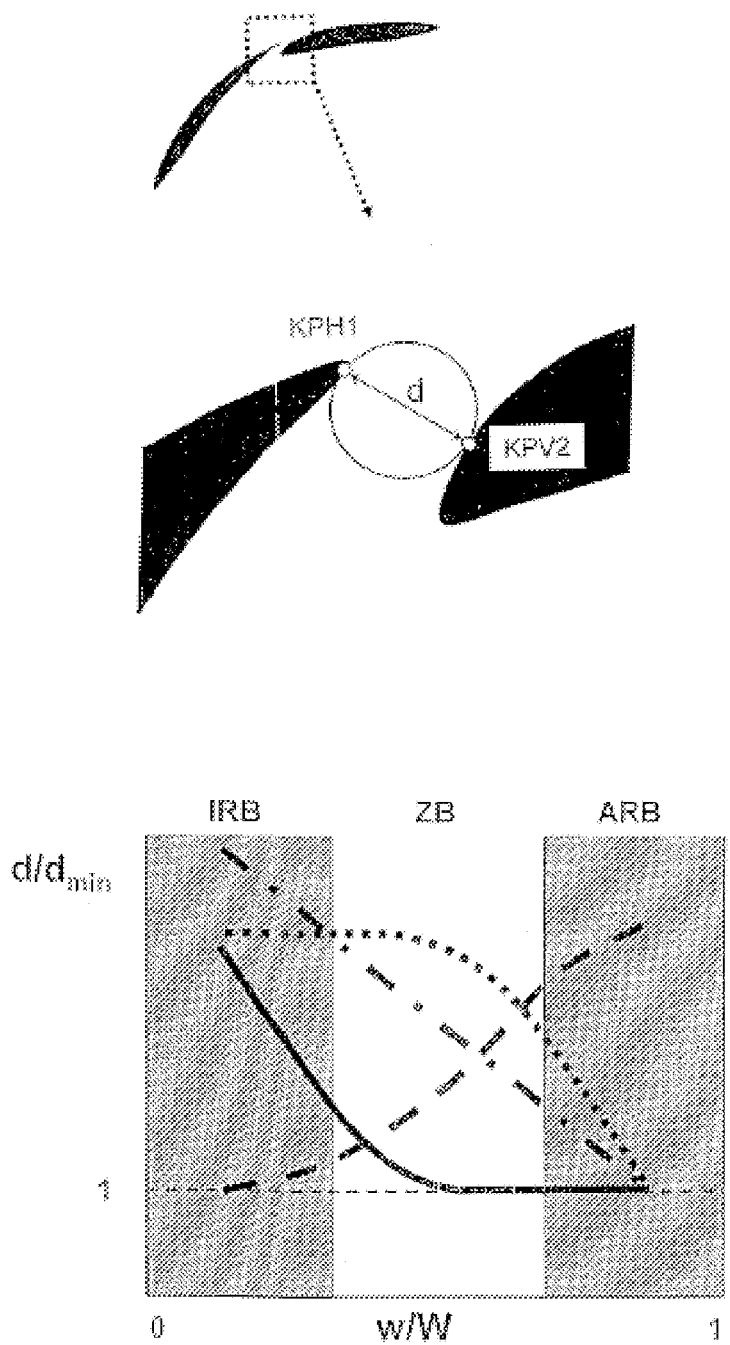
Figure 7B:
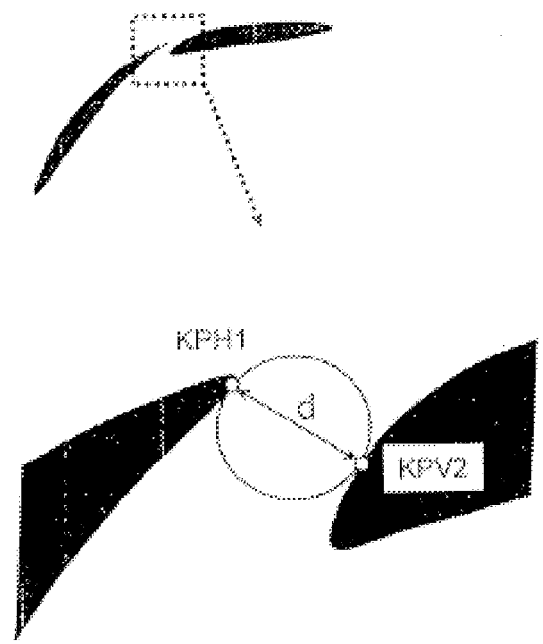
Figure 7B:
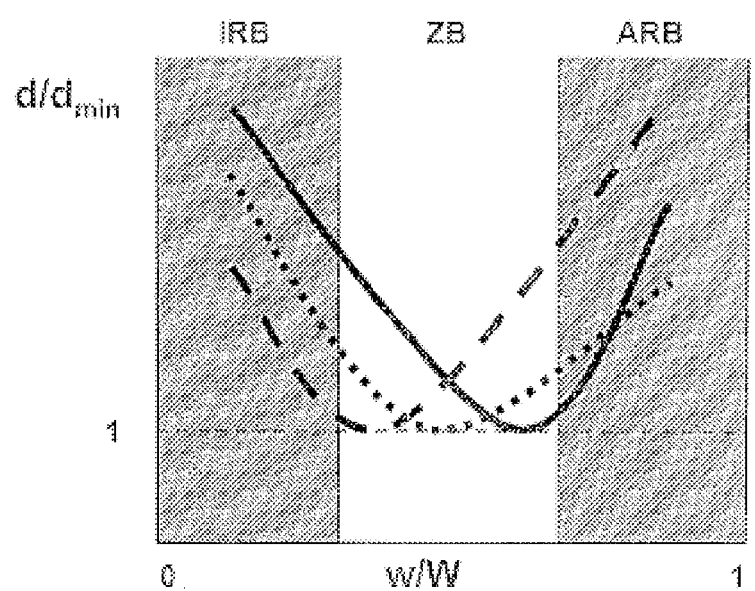

The present invention is described in the following in light of the accompanying figures, showing exemplary embodiments:

FIG. 1 (Prior Art) shows a schematic representation of a blade in accordance with the prior art, FIG. 2 shows exemplary embodiments of blades according to the present invention in meridional view, FIG. 3 shows an exemplary embodiment of a multi-profile configuration in the flow line profile section X-X of FIG. 2, partial illustrations (a) and (b), FIG. 4 shows the definition of meridional flow lines and meridional flow line profile sections, FIG. 5a shows an exemplary embodiment of a blade according to the present invention in meridional view (left-hand side) and meridional flow line profile sections (right-hand side), FIG. 5b shows a meridional flow line profile section as per view A-A from FIG. 5a, FIG. 5c shows an exemplary embodiment of a blade according to the present invention in a perspective view of the pressure side (left-hand side) and of the suction side (right-hand side), FIG. 5d shows an exemplary embodiment with further blades according to the present invention in a perspective view of the pressure side (left-hand side) and of the suction side (right-hand side), FIG. 5e shows further exemplary embodiments of blades according to the present invention in a perspective view of the pressure side (left-hand side) and of the suction side (right-hand side), FIG. 6*a* shows further exemplary embodiments of blades according to the present invention in meridional view (left-hand side) and meridional flow line profile sections (right-hand side), FIG. 6*b* shows further exemplary embodiments of blades according to the present invention in three-dimensional view of the pressure side (left-hand side) and of the suction side (right-hand side), FIG. 6*c* shows further exemplary embodiments of blades according to the present invention in meridional view (left-hand side) and meridional flow line profile suctions (right-hand side), FIG. 6*d* shows further exemplary embodiments of blades according to the present invention in three-dimensional view of the pressure side (left-hand side) and of the suction side (right-hand side), FIG. 7*a* shows a development of the passage width along the blade height, with maximum value in the inner or outer boundary area, and FIG. 7*b* shows a development of the passage width along the blade height, with minimum value in the central area.

A conventional blade according to the state of the art, as shown in FIG. 1 (Prior Art), has no subdivision, over a selected part of the blade height, into several profiles arranged one behind the other. Only so-called tandem configurations are known, in which a deflecting task is performed by two structurally separated blade rows.

The lower portion of FIG. 1 (Prior Art) shows a profile section of the blade shown in meridional view in the upper portion of the figure. Casing 1 and hub 2 form the flow path for blade row 4, which is arranged around machine axis 3. Each blade has a suction side 5 and a pressure side 6. The incoming flow is, in the meridional view, indicated by the bold arrow, from left to right. With conventional blades, the flow passes around the individual profile sections of the blades (see profile section P-P) from the leading edge onwards separately and without fluid communication between the blade sides.

FIG. 2 shows examples of blades in accordance with the invention, in the meridional plane formed by the axial coordinate x and the radial coordinate r. All partial illustrations show the view of the blade pressure side.

The partial illustration (a) shows a blade in accordance with the invention with two fixed blade ends. This can be a rotor in which a platform with root forms the inner main flow path boundary (hub 2) and a shroud forms the outer main flow path boundary. This can also be a stator, in which a shroud forms the inner main flow path boundary and a platform with root forms the outer main flow path boundary. Both fixed blade ends have here a single-profile configuration adjoined towards the blade center by a zone with multi-profile configuration (in this case with two partial profiles). The blade area with multi-profile configuration is illustrated schematically by the passage shown as a dotted area between two partial profiles. In accordance with the invention, the passage or the multi-profile configuration on the illustrated blade pressure side does not reach as far as the main flow path boundary, but adjoins a blade section with single-profile configuration at a certain distance from the innermost or outermost section of the blade.

The partial illustration (b) shows a variant in accordance with the invention with three partial profiles and accordingly two passages. The partial illustrations (c) to (f) show blade configurations in accordance with the invention having only one passage, however here too arrangements having more than one passage are in accordance with the invention.

The partial illustrations (c) and (d) show a blade in accordance with the invention with one fixed blade end on the hub 2 and a free outer blade end. This can be a rotor in which a platform with root forms the inner main flow path boundary (hub 2) and a running gap is provided on the outer main flow path boundary (casing 1). This can also be a stator in which a platform with root forms the inner main flow path boundary (hub 2) and a gap is provided on the outer main flow path boundary (casing 1). The selected representation includes a running gap and a casing enclosing the blade row. However, a non-enclosed configuration without casing is also in accordance with the invention. In accordance with the invention, in each of both cases, the blade area with multi-profile configuration on the blade pressure side at the fixed blade end does not reach as far as the main flow path boundary, but adjoins a zone with single-profile configuration at a certain distance from the main flow path boundary.

The partial illustrations (e) and (f) show a blade in accordance with the invention with a fixed blade end on casing 1 and a free blade end on hub 2. This can be a stator 12 in which a platform with root forms the outer main flow path boundary (casing) and a gap is provided on the inner main flow path boundary (hub). In accordance with the invention, in each of both cases, the blade area with multi-profile configuration on the blade pressure side at the fixed blade end does not reach as far as the main flow path boundary, but adjoins a zone with single-profile configuration at a certain distance from the main flow path boundary.

FIG. 3 shows in the flow line profile section marked X-X in the partial illustrations (a) and (b) of FIG. 2 the profile arrangement in the area of the blade with multi-profile configuration. It is possible here in accordance with the invention to provide an arrangement having only two partial profiles (a front profile 7 and a first following profile 9), see partial illustration 3(*a*), or in a special case an arrangement with N>2 partial profiles (a front profile 7 and N−1 following profiles 9, 10), see partial illustration 3(*b*). The meridional distance Am between the trailing edge of a partial profile and the leading edge of the adjacently arranged downstream partial profile can vary in accordance with the invention along the blade height and assume both positive and negative values (including the value zero). With positive Am, a gap between two partial profiles, which can be seen through in the circumferential direction u, is created in the meridional view (x-r plane). It can however also be particularly favorable to provide negative values of Am; adjacent partial profiles then overlap and form a duct-like flow passage between them, having in special cases the shape of a convergent nozzle. Negative values of Am are favorable in particular in that area of the blade height in which the multi-profile configuration changes into the single-profile configuration. It is favorable in accordance with the invention if the meridional distance Am, starting from a point in the central area of the blade in the direction of at least one blade end, decreases continuously until the point of changeover from multi-profile configuration to single-profile configuration. A particularly favorable arrangement provides here for negative values of Am at least directly at the point of changeover from multi-profile configuration to single-profile configuration and in a part of the blade height adjoining the point of changeover.

FIG. 4 provides a precise definition of the meridional flow lines and the meridional flow line profile sections, and shows a rotor 11 and stator 12. The mean meridional flow line 14 is formed by the geometric centre of the main flow path. In the case in which no casing 1 exists, the outermost meridional flow line touching the blade tip acts as the outer confinement of the main flow path. If a perpendicular is erected at every point of the mean meridional flow line 14, the result along the latter is the main flow path width W, and further meridional flow lines can be ascertained by equal relative subdivision of the perpendicular. The section of a meridional flow line with a blade results in a meridional flow line profile section. Further considerations of the blade in accordance with the invention are based on the meridional flow line profile sections.

FIG. 5a shows on the left-hand side the blade in accordance with the invention in the meridional view (x-r plane) looking onto the pressure side 6 of the blade. The blade is divided along its blade height (or in the direction of the main flow path width, respectively) into three areas. Thus the central area ZB is located between the meridional flow line profile section MSLi at 35% of the main flow path width and the meridional flow line profile section MSLo at 65% of the main flow path width. Even more favorable is however a central area ZB located between a meridional flow line profile section MSLi at 20% of the main flow path width and a meridional flow line profile section MSLo at 80% of the main flow path width. The main flow direction is indicated by a bold arrow. The inner boundary area of the blade IRB is located between the inner main flow path boundary HBi and the meridional flow line profile section MSLi. The outer boundary area of the blade ARB is located between the meridional flow line profile section MSLo and the outer main flow path boundary HBo. In the area between the meridional flow line profile section marked MSL1, located at any point inside the inner boundary area IRB, and the meridional flow line profile section marked MSL2, located at any point inside the outer boundary area ARB, the blade in accordance with the invention shown here has a multi-profile configuration. In at least one of the boundary areas IRB and ARB, a changeover from multi-profile configuration to single-profile configuration is provided when viewing the blade profile geometry changes in the direction of the respective main flow path boundary. The variant of the blade in accordance with the invention shown here has in the section B-B shown a single-profile configuration and in the section C-C shown a multi-profile configuration. It can be favorable in accordance with the invention when the changeover from multi-profile configuration to single-profile configuration is provided substantially or even exactly on a meridional flow line profile section (as defined in connection with FIG. 4). In accordance with the given definition, each meridional flow line profile section is on a rotation-symmetrical surface. The passage formed by the multi-profile configuration is confined at the changeover from multi-profile configuration to single-profile configuration by a flank surface FF whose edge on the pressure side in FIG. 5a appears as a line. The flank surface FF is, in the case of the variant shown here of a blade in accordance with the invention, completely on a meridional flow line profile section, i.e. on a conical surface with the axis of the fluid-flow machine as the central axis.

FIG. 5b shows section A-A of FIG. 5a, a plan view onto the flank surface FF acting as a confinement to the passage at the edge of the single-profile configuration area of the blade. It is possible here, as shown in FIG. 5b at the top, for the changeover from the multi-profile configuration to the single-profile configuration to be smooth, when viewed orthogonally to the flow line profile section, such that at the point of changeover from the multi-profile to the single-profile configuration the profile contour of the single profile encloses the partial profiles of the multi-profile arrangement and forms at least partially joint contour sections with the partial profiles of the multi-profile arrangement, or in accordance with the invention as shown in FIG. 5b at the bottom, when viewed orthogonally to the flow line profile section at the changeover from the multi-profile configuration to the single-profile configuration, a trailing edge and/or a leading edge of a partial profile in the multi-profile area can project beyond the profile contour of the adjacent single-profile area.

FIG. 5c shows two perspective views of the blade in accordance with the invention from FIGS. 5a and 5b. Here the example of a blade in accordance with the invention according to FIG. 5b at the top is selected, i.e. without a projecting leading and/or trailing edge in the multi-profile area. The two perspective views allow the passage, the multi-profile configuration in the passage zone and the flank surface FF, here shown hatched, to be discerned. A pressure-side perspective view of the blade is shown in the upper portion of the figure and a suction-side perspective view of the blade is shown in the lower portion of the figure. Both on the pressure side 6 of the blade and on the suction side 5 of the blade, the edges of the flank surface (DSFFK and SSFFK) are on the same meridional flow line profile section MSL1. In the variant shown here of the blade in accordance with the invention, the flank surface or its pressure-side edge DSFFK, respectively, does not reach the leading edge of a partial profile upstream in the meridional direction.

FIG. 5d shows in the upper portion a perspective pressure-side view of a blade in accordance with the invention, where the flank surface FF or its edge DSFFK, respectively, reaches on the pressure side into the immediate vicinity of or directly up to the leading edge of a partial profile. FIG. 5d shows in the lower portion a perspective suction-side view of a blade in accordance with the invention, where the flank surface FF on the suction side SS or its edge SSFFK, respectively, reaches into the immediate vicinity of or directly up to the trailing edge of a partial profile.

FIG. 5e shows in the upper portion a perspective pressure-side view of a blade in accordance with the invention, in which the flank surface FF starts on the pressure side 6, as in FIG. 5d, only downstream of the leading edge of a partial profile. The pressure-side edge of the flank surface FF is here too completely inside a meridional flow line profile section MSL1. The right-hand half of the figure shows the case in accordance with the invention where the suction-side edge SSFFK of the flank surface FF is at least partially closer to the blade end or closer to the main flow path boundary than the pressure-side edge DSFFK of the flank surface FF. This results in a course of the flank surface FF inclined relative to the main flow path boundary of the blade end concerned, based on the circumferential direction u and/or the meridional direction m of the fluid-flow machine. It is here favorable in accordance with the invention when the complete SSFFK edge is closer to the blade end or closer to the main flow path boundary than the DSFFK edge. It is particularly favorable when the SSFFK edge is substantially or precisely at the blade end or at the main flow path boundary, respectively.

FIG. 6a shows on the left-hand side a blade in accordance with the invention in the meridional view (x-r plane) looking onto the pressure side 6 of the blade. The main flow direction is indicated by a bold arrow. In at least one of the boundary areas IRB and ARB, a changeover from multi-profile configuration to single-profile configuration is provided when viewing the blade profile geometry changes in the direction of the respective main flow path boundary. The variant of the blade in accordance with the invention shown here has in the section C-C shown a multi-profile configuration and close to the inner main flow path boundary HBi a single-profile configuration. As shown here, it can be advantageous in accordance with the invention when the course of the pressure-side edge DSFFK of the flank surface and/or the course of the flank surface FF itself approaches in the flow direction a blade end or a main flow path boundary, respectively, and is thus inclined relative to the meridional flow line profile sections of the blade. It is favorable here, if also the course of the suction-side edge SSFFK of the flank surface approaches in the flow direction a blade end or a main flow path boundary, respectively, and is thus inclined relative to a meridional flow line profile section. It is particularly favorable in accordance with the invention when at least one of the DSFFK and SSFFK edges and/or the flank surface FF reaches with at least a partial section of its edge a blade end or a main flow path boundary and there ends at or upstream of the trailing edge of a partial profile or the trailing edge of the blade, so that only the blade section directly at the main flow path boundary represents a pure single-profile section. It can be favorable here when the single-profile section has on the main flow path boundary a step where the flank surface changes over to the contour of the main flow path boundary, as illustrated top right in FIG. 6a. As the view B-B shows, it can be favorable in accordance with the invention when partial profiles of a multi-profile configuration overlap in the flow direction and in this way give the passage a duct-like shape, if necessary even a nozzle-like shape. As FIG. 6a shows on the left, the trailing edge HKT1 of a front partial profile is downstream of the leading edge VKT2 of a rear partial profile. It can furthermore be advantageous when the dimension of the overlap increases at least in a partial section of the overall blade towards the main flow path boundary of the blade end in question. As shown in FIG. 6a by a dotted line, the trailing edge HKT1 of a front partial profile can extend in the direction of the main flow path boundary increasingly far downstream of the leading edge VKT2 of a rear partial profile and accordingly be curved and increasingly inclined relative to the meridional flow direction. It is furthermore favorable when the flank surface FF is substantially or precisely on a conical surface whose central axis is defined by the axis of the fluid-flow machine.

FIG. 6b shows two perspective views of the blade in accordance with the invention from FIG. 6a. The two perspective views allow the passage, the multi-profile configuration in the zone of the passage and the flank surface FF, shown hatched, to be discerned. A pressure-side view is shown in the upper portion and a suction-side view of the blade is shown in the lower portion. On the pressure side 6 of the blade, on the inner (in this case lower) blade end, the edge of the flank surface DSFFK can be clearly discerned, which is like the flank surface FF itself inclined relative to the meridional flow line profile sections of the blade, e.g. MSL1, and does not reach the leading edge of a partial profile. In the suction-side view of the blade, the overlap in accordance with the invention of partial profiles of a multi-profile configuration is shown. The overlap increases towards the main flow path boundary (in this exemplary case the inner one). The flank surface FF issues into the surface of the main flow path boundary. The corresponding issuing line forms a ledge or step in the suction-side course of the single profile provided directly on the main flow path boundary.

FIG. 6c shows on the left-hand side a blade in accordance with the invention in the meridional view (x-r plane) looking onto the pressure side 6 of the blade. The variant shown here of the blade in accordance with the invention has a course of the pressure-side edge DSFFK of the flank surface and/or a course of the flank surface FF itself which in the starting section is aligned substantially first in the meridional flow direction and then has in the flow direction an inclination relative to the meridional flow direction. It can be favorable here when the inclination relative to the meridional flow direction decreases again towards the end section of the flank surface FF and a curve with S-shaped course is provided accordingly inside the flank surface FF. FIG. 6c shows the special case in accordance with the invention of a blade in which the flank surface is part of a conical surface around the machine axis and results, by projection into the meridional plane (x-r), in a uniform line, the projection line PL (shown in the figure left in dotted form and including the DSFFK edge). FIG. 6c shows the special case in accordance with the invention of a blade in which the flank surface FF contacts with a section of its edge the main flow path boundary of the respective blade end and touches the trailing edge of a partial profile or the trailing edge of the blade. If the flank surface FF reaches as far as the trailing edge of a partial profile, a single profile with thick trailing edge is correspondingly provided directly at the main flow path boundary.

FIG. 6d shows the associated perspective views of the blade in accordance with the invention from FIG. 6c.

The edges of the flank surfaces and partial profiles, shown in sharp form for reasons of clarity in FIGS. 5a to 6d, can in accordance with the invention be designed, like all other edges or corners of conventional blades, to be rounded or radiused.

FIG. 7a shows the selection in accordance with the invention of the passage width in the area of the multi-profile configuration. At top in the figure a blade section with multi-profile configuration (in this case 2 partial profiles) is shown. The region around the trailing edge of the front partial profile and around the leading edge of the rear partial profile is marked with a small window and shown in enlarged form in the middle. The passage between the partial profiles is clearly discernible. On a fixed radius, i.e. at a fixed distance to the axis of the fluid-flow machine, the locally smallest passage width d occurring between the partial profiles can be determined. This is done by determining the smallest circle that can be inscribed on the given radius between the two profiles and by measuring its diameter d. The contact points of the circle with the profiles (KPH1 close to the trailing edge of a front partial profile and KPV2 close to the leading edge of a rear partial profile) are in this case on the same radius. If this method is used along the blade height for all the radii where there is a multi-profile configuration, the radial distribution of the passage width d is obtained, shown without dimensions in respect of the ascertained minimum value dmin, and in the bottom of the figure over the blade height w, made dimensionless with the width of the main flow path W, as $d/d_{min} = fkt(w/W)$. In accordance with the invention, the maximum passage width is provided in one of the blade boundary areas IRB and ARB. It can be advantageous in accordance with the invention when the minimum passage width is then in the other of the two blade boundary areas IRB and ARB. Between the point of maximum passage width and the point of minimum passage width, a substantially or precisely linear distribution can be provided. It is also in accordance with the invention when a distribution of the passage width between the point of maximum passage width and the point of minimum passage width is S-shaped. It is also in accordance with the invention when a distribution of the passage width is substantially or exactly constant between a point in the central area ZB and the point of minimum passage width. It is also in accordance with the invention when a distribution of the passage width is substantially or exactly constant between the point of maximum passage width and a point in the central area ZB.

FIG. 7b shows, similarly to FIG. 7a, further distributions in accordance with the invention of the passage width in the area of the multi-profile configuration. In accordance with the invention, the maximum passage width is provided in one of the blade boundary areas IRB and ARB while the minimum passage width is in the central area ZB. It is favorable in accordance with the invention when the passage width in both blade boundary areas IRB and ARB assumes values above the minimum value.

It is advantageous when the maximum value of the passage width is greater than the minimum value of the passage width by at least the factor 1.5, in accordance with dmax/dmin >1.5.

FURTHER DESCRIPTION OF THE INVENTION

1. Blade of a rotor or stator row with hybrid profile configuration for use in a fluid-flow machine, where the blade is arranged in a main flow path confined by an inner and an outer main flow path boundary and having a main flow path width W, where the blade is split in the direction of its blade height into the inner boundary area IRB (defined between the inner main flow path boundary HBi and a nearby inner meridional flow line profile section MSLi), the outer boundary area ARB (defined between the outer main flow path boundary HBo and a nearby outer meridional flow line profile section MSLo) and the central area (defined between the inner meridional flow line profile section MSLi and the outer meridional flow line profile section MSLo), where at least one of the meridional flow line profile sections MSLi and MSLo is provided at a distance of max. 35% of the main flow path width from the respective main flow path boundary, where the blade has in at least parts of the central area a multi-profile configuration such that at least two partial profiles arranged one behind the other in the flow direction are provided, of which each has substantially the shape of a blade profile, where a passage is provided between each two partial profiles and is passed through by fluid from the blade pressure side to the blade suction side, where at least one passage has, along the blade height, a variable passage width d, where a local value of the passage width d is measured by the smallest distance that can be determined by inscribing a circle between the contours of two adjacent partial profiles on the same radius, where the development of the passage width d along the blade height assumes a maximum value in at least one of the inner and outer boundary areas IRB and ARB, where in at least one of the inner and outer boundary areas IRB and ARB, a changeover from the multi-profile configuration to the single-profile configuration is provided when viewing the blade profile section geometry in the direction of the main flow path boundary adjoining the respective boundary area (IRB or ARB) and the at least one passage ends at the point of changeover confined by a flank surface FF, where a part of the edge of the flank surface FF is designed as a SSFFK edge on the blade suction side, where a part of the edge of the flank surface FF is designed as a DSFFK edge on the blade pressure side and a distance greater than zero is provided between the DSFFK edge and the main flow path boundary, where at least one of the boundary areas IRB and ARB is provided at a fixed blade end (provided with shroud or blade root).

2. Blade in accordance with item 1, characterized in that at least one of the meridional flow line profile sections MSLi and MSLo is provided at a distance of max. 20% of the main flow path width from the respective main flow path boundary.

3. Blade in accordance with item 1 or 2, characterized in that when viewing the blade along its blade height the changeover from the multi-profile configuration to the single-profile configuration is such that the profile contour of the single profile encloses the partial profiles of the multi-profile arrangement and forms at least partially joint contour sections with the partial profiles of the multi-profile arrangement.

4. Blade in accordance with item 1 or 2, characterized in that when viewing the blade along its blade height the changeover from the multi-profile configuration to the single-profile configuration is such that at least one of the trailing and leading edges of the partial profiles of the multi-profile arrangement projects beyond the profile contour of the single profile.

5. Blade in accordance with one of the items 1 to 4, characterized in that at least one of the flank surface edges SSFFK and DSFFK is provided substantially or exactly in a meridional flow line profile section.

6. Blade in accordance with one of the items 1 to 5, characterized in that the suction-side flank surface edge SSFFK is at least partially closer to the main flow path boundary of the respective boundary area (IRB or ARB) than the pressure-side flank surface edge DSFFK, resulting in a course of the flank surface FF inclined relative to the circumferential direction u and/or the meridional direction m and—in flow direction—to the main flow path boundary.

7. Blade in accordance with one of the items 1 to 6, characterized in that the suction-side flank surface edge SSFFK is at least partially provided at the main flow path boundary upstream of a trailing edge or at a trailing edge of a partial profile and that thus a single profile configuration is provided in the respective boundary area (IRB or ARB) only in the meridional flow line profile section directly at the main flow path boundary.

8. Blade in accordance with one of the items 1 to 7, characterized in that at least one section of one of the flank surface edges DSFFK and SSFFK approaches in the flow direction a main flow path boundary and is thus inclined relative to meridional flow line profile sections of the blade.

9. Blade in accordance with one of the items 1 to 8, characterized in that the course of the pressure-side flank surface edge DSFFK, when viewed in the flow direction,
 a) features a first section, in which the DSFFK is substantially or exactly provided along a meridional flow line profile section,
 b) features a second section adjoining the first one in the flow direction, in which the DSFFK is provided inclined relative to the meridional flow direction and thereby approaches the main flow path boundary adjoined by the boundary area (IRB or ARB) including the DSFFK.

10. Blade in accordance with one of the items 1 to 9, characterized in that the flank surface FF is substantially or precisely provided as part of a conical surface whose axis of symmetry is defined by the axis of the fluid-flow machine, such that the projection of the flank surface FF into the meridional plane (x-r) results in a line, the so-called projection line PL.

11. Blade in accordance with item 10, characterized in that the projection line PL provided is given an S-shaped course.

12. Blade in accordance with one of the items 1 to 11, characterized in that the pressure-side flank surface edge DSFFK starts in the immediate vicinity of or directly at the leading edge of a partial profile, or at the leading edge of the blade, respectively.

13. Blade in accordance with one of the items 1 to 12, characterized in that the suction-side flank surface edge SSFFK starts in the immediate vicinity of or directly at the leading edge of a partial profile, or at the leading edge of the blade, respectively.

14. Blade in accordance with one of the items 1 to 13, characterized in that the multi-profile configuration includes an arrangement with at least two partial profiles, where a meridional distance Am between the trailing edge of a partial profile and the leading edge of the adjacently arranged downstream partial profile is defined, where the meridional distance Am in at least one part of the main flow path width is provided with negative values and thus adjacent partial profiles overlap in the meridional flow direction and form a duct-like flow passage between them, where the overlap at least in a partial section of the blade increases towards the main flow path boundary of the respective blade end, and the trailing edge HKT1 of a front partial profile extends in the direction of the main flow path boundary increasingly far downstream of the leading edge VKT2 of a rear partial profile.

15. Blade in accordance with item 14, characterized in that a decreasing overlap is provided, starting from a point in the central area ZB of the blade and extending in the direction of at least one blade end up to the point of changeover from the multi-profile configuration to the single-profile configuration.

16. Blade in accordance with one of the items 1 to 15, characterized in that the suction-side flank surface edge SSFFK is provided at the main flow path boundary such that the meridional flow line profile section of the blade features a ledge directly on the main flow path boundary at a point upstream of or directly at the trailing edge of a partial profile or of the blade, respectively.

17. Blade in accordance with one of the items 1 to 16, characterized in that the distribution of the passage width d/dmin=fkt (w/W) in the central area ZB assumes a minimum value.

18. Blade in accordance with one of the items 1 to 17, characterized in that the maximum value of the passage width is greater than the minimum value of the passage width by at least the factor 1.5, in accordance with dmax/dmin >1.5.

LIST OF REFERENCE NUMERALS

1 Casing
2 Hub
3 Machine axis
4 Blade row
5 Suction side
6 Pressure side
7 Front profile
8 Passage
9 First following profile
10 Second following profile
11 Rotor
12 Stator
13 Main flow path
14 Mean meridional flow line

What is claimed is:

1. A blade of a rotor or stator row with hybrid profile configuration for use in a fluid-flow machine,
    the blade being configured for positioning in a main flow path confined by an inner and an outer main flow path boundary and having a main flow path width W, where the blade is split in a direction of its blade height into an inner boundary area IRB (defined between the inner main flow path boundary HBi and a nearby inner meridional flow line profile section MSLi), an outer boundary area ARB (defined between the outer main flow path boundary HBo and a nearby outer meridional flow line profile section MSLo) and a central area ZB (defined between the inner meridional flow line profile section MSLi and the outer meridional flow line profile section MSLo), the blade also including a plurality of further meridional flow line profile sections,
    wherein at least one of the meridional flow line profile sections MSLi and MSLo is provided at a distance of max. 35% of the main flow path width from its associated main flow path boundary,
    wherein the blade has in at least parts of the central area a multi-profile configuration such that at least two partial profiles arranged one behind the other in the flow direction are provided, of which each has substantially a blade profile shape,
    wherein at least one passage is provided between each of the at least two partial profiles and is passed through by fluid from a blade pressure side to a blade suction side,
    wherein the at least one passage has, along the blade height, a variable passage width d,
    wherein a local value of the variable passage width d is measured by a smallest distance that can be determined by inscribing a circle between contours of the at least two partial profiles on a same radius from an axis of the fluid-flow machine,
    wherein the variable passage width d along the blade height has a maximum value in at least one of the inner and outer boundary areas IRB and ARB,
    wherein in at least one of the inner and outer boundary areas IRB and ARB, a changeover from the multi-profile configuration to a single-profile configuration is provided when viewing a blade profile section geometry in a direction of the main flow path boundary adjoining the respective boundary area (IRB or ARB) and the at least one passage ends at the point of changeover confined by a flank surface FF,
    wherein the flank surface FF includes an edge SSFFK on the blade suction side,
    wherein the flank surface FF includes an edge DSFFK on the blade pressure side and a distance greater than zero is provided between the pressure-side flank surface edge DSFFK and the nearest main flow path boundary,
    wherein at least one of the boundary areas IRB and ARB is provided at a fixed blade end provided with a shroud or blade root;
    wherein the multi-profile configuration includes an arrangement with at least two partial profiles,
    wherein a meridional distance Am between a trailing edge of a partial profile and a leading edge of an adjacently arranged downstream partial profile is defined,
    wherein the meridional distance Am in at least one part of the main flow path width is provided with negative values and thus adjacent partial profiles overlap in the meridional flow direction and form a duct-like flow passage between them,
    wherein the overlap at least in a partial section of the blade increases towards the main flow path boundary of the respective blade end, and the trailing edge HKT1 of a front partial profile extends in the direction of the main flow path boundary of the respective blade end increasingly far downstream of a leading edge VKT2 of a rear partial profile, and
    wherein at least one of the following: a decreasing overlap is provided, starting from a point in the central area ZB of the blade and extending in a direction of at least one blade end up to the point of changeover from the multi-profile configuration to the single-profile configuration; or the suction-side flank surface edge SSFFK is provided at the main flow path boundary nearest the suction-side flank surface edge SSFFK such that one of the plurality of further meridional flow profile sections of the blade includes a ledge in its suction-side course directly on the main flow path boundary nearest the suction-side flank surface edge SSFFK at a point upstream of or directly at at least one of the trailing edge of the partial profile or a trailing edge of the blade.

2. The blade of claim 1, wherein at least one of the meridional flow line profile sections MSLi and MSLo is provided at a distance of max. 20% of the main flow path width from its associated main flow path boundary.

3. The blade of claim 2, wherein, when viewing the blade along its blade height the changeover from the multi-profile configuration to the single-profile configuration is such that a profile contour of the single profile encloses the partial profiles of the multi-profile configuration and forms at least partially joint contour sections with the partial profiles of the multi-profile configuration and that when viewing the blade along its blade height the changeover from the multi-profile configuration to the single-profile configuration is such that at least one of the trailing edge and a leading edge of the partial profiles of the multi-profile arrangement projects beyond the profile contour of the single profile.

4. The blade of claim 3, wherein at least one of the flank surface edges SSFFK and DSFFK is provided substantially or exactly in one of the plurality of further meridional flow profile sections.

5. The blade of claim 4, wherein the suction-side flank surface edge SSFFK is at least partially provided at the main flow path boundary at or upstream of the trailing edge of the partial profile and that thus a single profile configuration is provided in the respective boundary area (IRB or ARB) only in one of the plurality of further meridional flow profile sections directly at the respective main flow path boundary.

6. The blade of claim 5, wherein at least one of the following applies: at least one section of one of the flank surface edges DSFFK and SSFFK approaches in the flow direction a main flow path boundary and is thus inclined relative to the meridional flow line profile sections of the blade; or that a course of the pressure-side flank surface edge DSFFK, when viewed in the flow direction,
 a) includes a first section, in which the pressure-side flank surface edge DSFFK is substantially or exactly provided along one of the plurality of further meridional flow profile sections, and
 b) includes a second section adjoining the first one in the flow direction, in which the pressure-side flank surface edge DSFFK is inclined relative to the meridional flow direction and thereby approaches the main flow path boundary adjoined by the boundary area IRB or ARB including the pressure-side flank surface edge DSFFK.

7. The blade of claim 6, wherein the flank surface FF is substantially or precisely provided as part of a conical surface whose axis of symmetry is defined by an axis of the fluid-flow machine, and the flank surface FF has an S-shaped course.

8. The blade of claim 7, wherein at least one of the following applies: the pressure-side flank surface edge DSFFK starts in an immediate vicinity of or directly at at least one of the leading edge of the partial profile or a leading edge of the blade; or the suction-side flank surface edge SSFFK starts in the immediate vicinity of or directly at the leading edge of at least one of the partial profile or the blade.

9. The blade of claim 8,
 wherein a distribution of the passage width $d/d_{min}=fkt$ (w/W) in the central area ZB assumes a minimum value, and the maximum value of the passage width is greater than the minimum value by at least a factor of 1.5, in accordance with $d_{max}/d_{min} \geq 1.5$.

10. The blade of claim 1, wherein, when viewing the blade along its blade height the changeover from the multi-profile configuration to the single-profile configuration is such that a profile contour of the single profile encloses the partial profiles of the multi-profile arrangement and forms at least partially joint contour sections with the partial profiles of the multi-profile arrangement and that when viewing the blade along its blade height the changeover from the multi-profile configuration to the single-profile configuration is such that at least one of the trailing edge and the leading edge of the partial profiles of the multi-profile arrangement projects beyond the profile contour of the single profile.

11. The blade of claim 10, wherein at least one of the flank surface edges SSFFK and DSFFK is provided substantially or exactly in one of the plurality of further meridional flow profile sections.

12. The blade of claim 11, wherein at least one of the following applies: the suction-side flank surface edge SSFFK is at least partially closer to the main flow path boundary of the respective boundary area (IRB or ARB) than the pressure-side flank surface edge DSFFK, resulting in a course of the flank surface FF inclined relative to at least one of the circumferential direction u or the meridional direction m and—in a flow direction—to the main flow path boundary; or that the suction-side flank surface edge SSFFK is at least partially provided at the main flow path boundary at or upstream of the trailing edge of the partial profile and that thus a single profile configuration is provided in the respective boundary area (IRB or ARB) only in one of the plurality of further meridional flow profile sections directly at the main flow path boundary.

13. The blade of claim 12, wherein at least one of the following applies: at least one section of one of the flank surface edges DSFFK and SSFFK approaches in the flow direction a main flow path boundary and is thus inclined relative to the meridional flow line profile sections of the blade; or that a course of the pressure-side flank surface edge DSFFK, when viewed in the flow direction,
 a) includes a first section, in which the pressure-side flank surface edge DSFFK is substantially or exactly provided along one of the plurality of further meridional flow profile sections, and
 b) includes a second section adjoining the first one in the flow direction, in which the pressure-side flank surface edge DSFFK is inclined relative to the meridional flow direction and thereby approaches the main flow path boundary adjoined by the boundary area IRB or ARB including the pressure-side flank surface edge DSFFK.

14. The blade of claim 13, wherein the flank surface FF is substantially or precisely provided as part of a conical surface whose axis of symmetry is defined by an axis of the fluid-flow machine, and the flank surface FF has an S-shaped course.

15. The blade of claim 14, wherein at least one of the following applies: the pressure-side flank surface edge DSFFK starts in the immediate vicinity of or directly at the leading edge of at least one of a partial profile or the blade; or the suction-side flank surface edge SSFFK starts in the immediate vicinity of or directly at the leading edge of at least one of the partial profile or the blade.

16. The blade of claim 15, wherein a distribution of the passage width $d/d_{min}=fkt$ (w/W) in the central area ZB assumes a minimum value, and the maximum value of the passage width is greater than the minimum value by at least a factor of 1.5, in accordance with $d_{max}/d_{min} \geq 1.5$.

17. The blade of claim 15,
 wherein the suction-side flank surface edge SSFFK is at least partially closer to the main flow path boundary of the respective boundary area (IRB or ARB) than the pressure-side flank surface edge DSFFK, resulting in a course of the flank surface FF inclined relative to at least one of the circumferential direction u or the meridional direction m and—in a flow direction—to the main flow path boundary of the respective boundary area, the flank surface FF mainly facing away from whichever of a radially inner or a radially outer end of the blade that the flank surface FF is located nearest to.

18. The blade of claim 1, wherein a distribution of the passage width $d/d_{min}=fkt\,(w/W)$ in the central area ZB assumes a minimum value, and the maximum value of the passage width is greater than the minimum value by at least a factor of 1.5, in accordance with $d_{max}/d_{min} \geq 1.5$.

19. The blade of claim 18, wherein the suction-side flank surface edge SSFFK is at least partially closer to the main flow path boundary of the respective boundary area (IRB or ARB) than the pressure-side flank surface edge DSFFK, resulting in a course of the flank surface FF inclined relative to at least one of the circumferential direction u or the meridional direction m and—in a flow direction—to the main flow path boundary of the respective boundary area, the flank surface FF mainly facing away from whichever of a radially inner or a radially outer end of the blade that the flank surface FF is located nearest to.

20. The blade of claim 1, wherein the suction-side flank surface edge SSFFK is at least partially closer to the main flow path boundary of the respective boundary area (IRB or ARB) than the pressure-side flank surface edge DSFFK, resulting in a course of the flank surface FF inclined relative to at least one of the circumferential direction u or the meridional direction m and—in a flow direction—to the main flow path boundary, of the respective boundary area the flank surface FF mainly facing away from whichever of a radially inner or a radially outer end of the blade that the flank surface FF is located nearest to.

* * * * *